Aug. 6, 1935.  W. SHURTLEFF  2,010,040
DIRECT READING COMFORTABLE TEMPERATURE INDICATOR
Filed Dec. 29, 1930
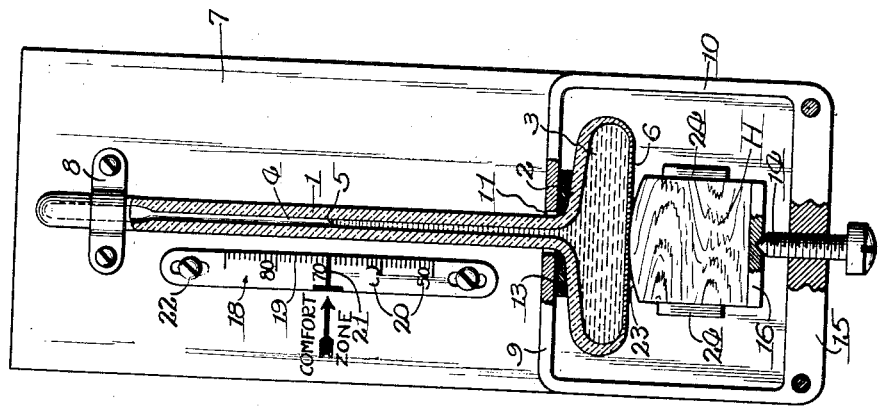
Inventor:
Wilfred Shurtleff
BY: George I. Haight
Atty.

Patented Aug. 6, 1935

2,010,040

UNITED STATES PATENT OFFICE 2,010,040

DIRECT READING COMFORTABLE TEMPERATURE INDICATOR

Wilfred Shurtleff, Moline, Ill., assignor to The Herman Nelson Corporation, Moline, Ill., a corporation of Illinois Application December 29, 1930, Serial No. 505,294

3 Claims. (Cl. 73—24)

This invention relates to direct reading comfortable temperature indicators.

In using the term "comfortable temperature" or "effective sensible temperature", it is intended to refer to that condition resulting from the combination of dry bulb temperature and relative humidity, which is considered to be conducive to physical comfort, as distinguished from dry bulb temperature without reference to relative humidity, and as distinguished from relative humidity without reference to dry bulb temperature.

It is well recognized that comfortable temperatures are governed to a large degree by the relative humidity of the air, and not merely by the temperatures indicated by the so-called dry bulb thermometers. Experiments have shown, for instance, that a given dry bulb temperature commonly thought to be desirable for physical comfort becomes very uncomfortable when the relative humidity is increased, and, on the other hand, a given dry bulb temperature commonly considered undesirable for physical comfort may be made comfortable by an increase or decrease in the relative humidity.

Dry bulb thermometers have been in use and are commonly known as indicators of dry bulb temperature. These thermometers include many different types of materials responsive to changes in dry bulb temperature, all of which give no indication of the relative humidity which is so important a factor in the condition which effects comfortable temperatures. Devices or instruments for measuring moisture conditions, or relative humidity, are also available. With the devices available attempts have been made to use an aggregation of a dry bulb thermometer and a wet bulb or humidity thermometer side by side, and, by the use of a chart in connection with the individual readings of these instruments, determine whether the particular condition represented by these two readings is within the range of comfortable temperatures. All of the attempts along these lines are naturally too complicated for the layman to determine whether the particular condition is within the range of comfortable temperatures.

The object, therefore, of this invention, is to provide an indicating instrument which is jointly responsive to both dry bulb temperature and relative humidity and arranged to directly indicate the resultant or combination of the two factors producing this resultant or combination.

Other objects of the invention will appear hereinafter.

Referring to the accompanying drawing,

The figure is a view partly in section of a direct reading comfortable temperature indicator embodying my invention.

As hereinbefore stated, it is well known that the conditions in an inhabited zone or room are affected by both the dry bulb temperature and the relative humidity, and that within a certain range the combinations of dry bulb temperature and relative humidity are productive of results which are considered comfortable temperatures. Deviations of one of the factors in this comfort zone or range, should be compensated for by a corresponding change of the other factor to provide a combination which is sensibly comfortable. For instance, assuming a dry bulb temperature of 72° provides an ideal or desirable comfortable temperature only when the relative humidity is about 50%. If for any reason the relative humidity at this dry bulb temperature should increase to, say, 90%, a comfortable temperature could still be maintained by correspondingly reducing the dry bulb temperature to, say, 67°. In other words, the comfortable temperature with this change in both factors would be sensibly the same as when the condition consisted of a dry bulb temperature of 72° with a relative humidity of 50%. In controlling room conditions, it is more practical to vary the dry bulb temperature by regulating the heating means in the room to conform the dry bulb temperature to whatever conditions of relative humidity may exist at the time.

Since in my present invention the readings or indications are those of the resultants of the two component factors which make up comfortable temperature, the instrument is of particular advantage as a means for checking the regulating devices which are used for varying the dry bulb or relative humidity conditions to maintain the desired comfortable temperature.

In the figure the instrument is similar in general to an ordinary dry bulb thermometer having a long tubular glass neck portion 1 with an enlargement or bulb formation 2 at its lower end, providing a chamber for containing a quantity of fluid or liquid 3 which moves in the neck or tube 1 by expansion or contraction in response to variations in dry bulb temperature. The volume of liquid, such as mercury or colored alcohol, in the restricted bore 4 of the tube is considerably smaller than that within the bulb 3, so that the travel of the level 5 of the liquid in the tube magnifies considerably the variations in the volume of the liquid due to expansion and contraction by temperature.

The bulb 2 is considerably larger than that usually employed in thermometers. The bottom wall 6 of the bulb is preferably flat and the glass is made thinner so as to have a slight degree of flexibility, with the result that the flexing of the glass bottom wall 6 will change the volume of liquid in the bulb and this change is reflected in the movement of the level 5 of the fluid vertically in the bore 4 of the tube.

This tube and bulb structure is suitably mounted in fixed position upon a base 7 by the clip 8 at its upper end and by the top wall 9 of a housing 10 which encloses the bulb, the upper wall 9 having a suitable opening 11 through which the tube 1 extends. A packing gland or cushion 13 surrounds the neck of the structure between the bulb and the wall 9 to firmly hold the structure in position when pressure is applied to the bottom wall 6, as will later be described.

The humidity responsive element H of the instrument consists preferably of a small rectangular block of wood which is interposed between the bottom wall 6 of the bulb and the point of an adjusting screw 14 threaded through the bottom wall 15 of the housing. This wood block H has a metal plate 16 at its bottom to serve as a bearing for the end of the adjusting screw, and its upper end bears against the bottom wall 6 of the bulb. This block of wood H changes its vertical dimension between the screw and the bottom wall 6 in response to variations in relative humidity, and its grain is disposed horizontally for this purpose. In thus varying its dimension, it exerts a variable pressure upon the bottom wall 6 of the bulb and varies the volume of liquid in the bulb, and the variations in the liquid are reflected in the movement of the column of liquid in the tube bore 4.

In consequence, the expansion or contraction of the liquid, due to dry bulb temperatures and the variable pressure exerted by the wood block H in response to changes in relative humidity, are both represented as a resultant or cumulative movement of the liquid level 5 in the tube, and this resultant movement is the true indication of the combination of both factors. Therefore, by placing a calibrated scale 18 alongside of the tube 1, the movement of the level 5, with respect to the calibrations 19 of the scale, enables the cumulative or resultant comfortable temperature to be directly observed. The calibrations can be labeled with numerals 20, ranging, say, from 50 to 90, and representing degrees of temperature. The resultant movement of the level 5 of the column of liquid in the tube may be read directly in terms of degrees.

The comfort zone, which comprises the range of combinations of dry bulb temperature and relative humidity generally considered to be comfortable temperatures, may be indicated on the scale 18 by heavier calibrations or characters 21, so that a person observing the position of the liquid level 5 with respect to this comfort zone will know instantly whether or not the room conditions are within the range of comfortable temperatures, and if the level 5 is observed to be beyond this comfort zone a person will know that some regulation of the room conditions is necessary.

The scale 18 may be fastened conveniently to the base by the screws 22 which extend through elongated slots in the scale to permit the scale to be adjusted relatively to the tube in accordance with the desired setting of the instrument. The adjusting screw 14 is used to adjust the compressive force which the humidity element H exerts against the bottom wall 6 of the bulb. Thus both the adjustable scale 18 and the adjustment obtained by the screw 14 make it possible to accurately calibrate the instrument and in addition make possible an adjustment to compensate for changes in the parts due to seasoning of the material over a period of years of service. The upper surface 23 of the wood block H may be slightly curved so that it will have proper contact with the wall 6 of the bulb. Vertical guides 24 may also be provided in the housing on each side of the block H to hold the block in position.

While I have illustrated my invention a single type of instrument, it is to be understood that the principles of adjustable compensation may be applied to other forms of indicators without departing from the spirit of the invention, and I contemplate any of these applications which come within the scope of the appended claims.

I claim:

1. In an indicating instrument of the class described, the combination of a dry bulb thermometer having a flexible bulb and having a column of liquid movable by expansion and contraction in response to temperature variations, a humidity responsive device operable on the flexible bulb for moving said column of liquid in response to humidity variations and a scale having calibrations thereon indicating the combined movement of the liquid column resulting from its responses to the temperature and humidity variations.

2. In an indicating instrument of the class described, the combination of a dry bulb thermometer having a flexible bulb and having a column of liquid movable by expansion and contraction in response to temperature variations, a humidity responsive device operable on the flexible bulb for moving said column of liquid in response to humidity variations, a scale having calibrations thereon indicating the combined movement of the liquid column resulting from its responses to the temperature and humidity variations, and means for adjusting the action of the humidity responsive element on said column of liquid.

3. In a direct reading sensible temperature indicator, the combination of a thermometer comprising a glass column and a flexible bulbous portion containing a body of expansible and contractible liquid, the level of which varies in the column in accordance with temperature variations, a block of fibrous material positioned to bear against the wall of said bulbous portion in varying degree according to the response of said fibrous block to humidity variations for varying the level of said liquid, and a scale calibrated to indicate the variations in said liquid level.

WILFRED SHURTLEFF.